Oct. 2, 1951  F. VON SCHLEGELL  2,569,507
HYDRAULIC OPERATING SYSTEM FOR MOWING MACHINES
Filed Oct. 27, 1945  3 Sheets-Sheet 1
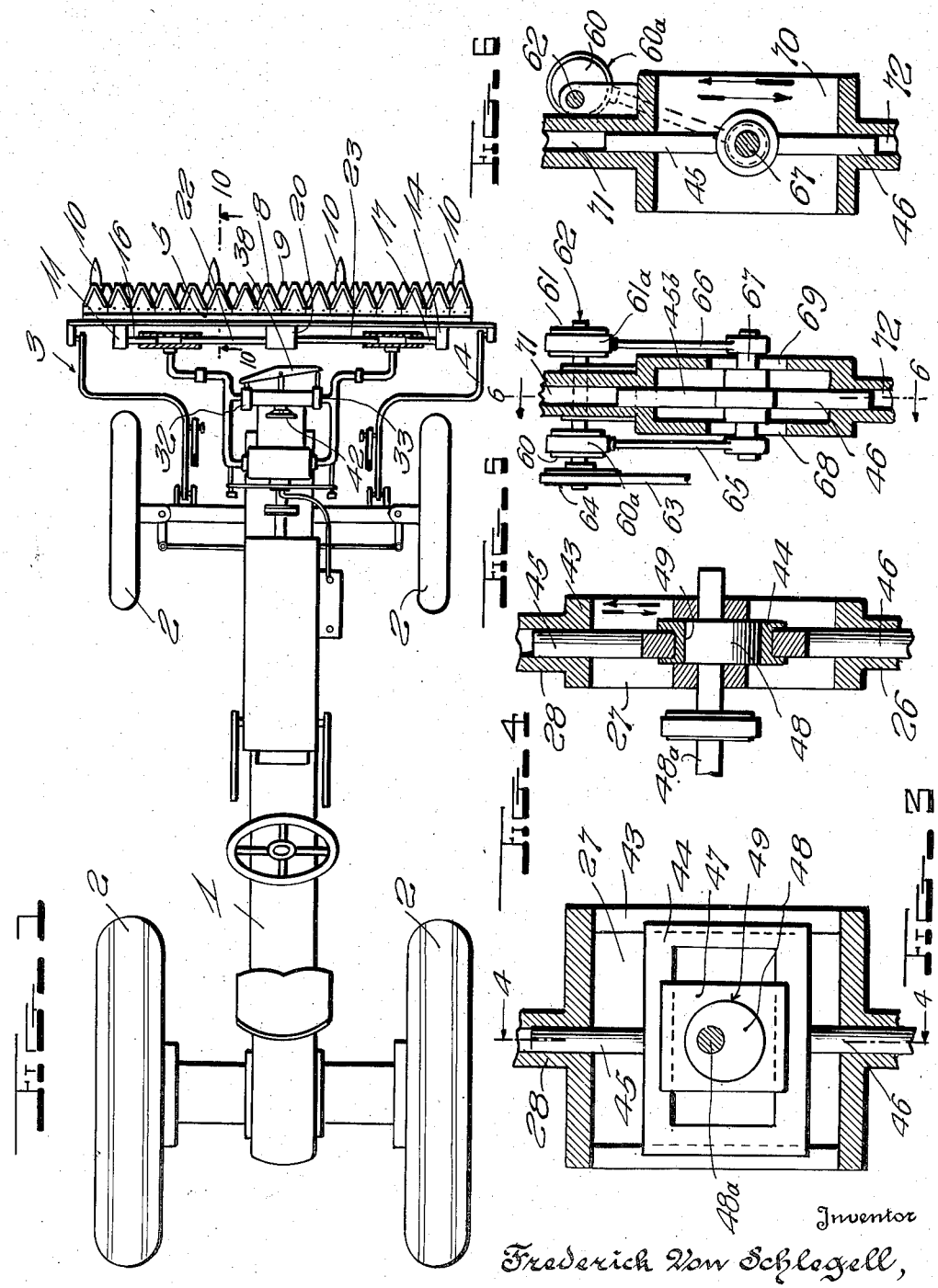
Inventor
Frederick Von Schlegell,
By John B. Brady
Attorney

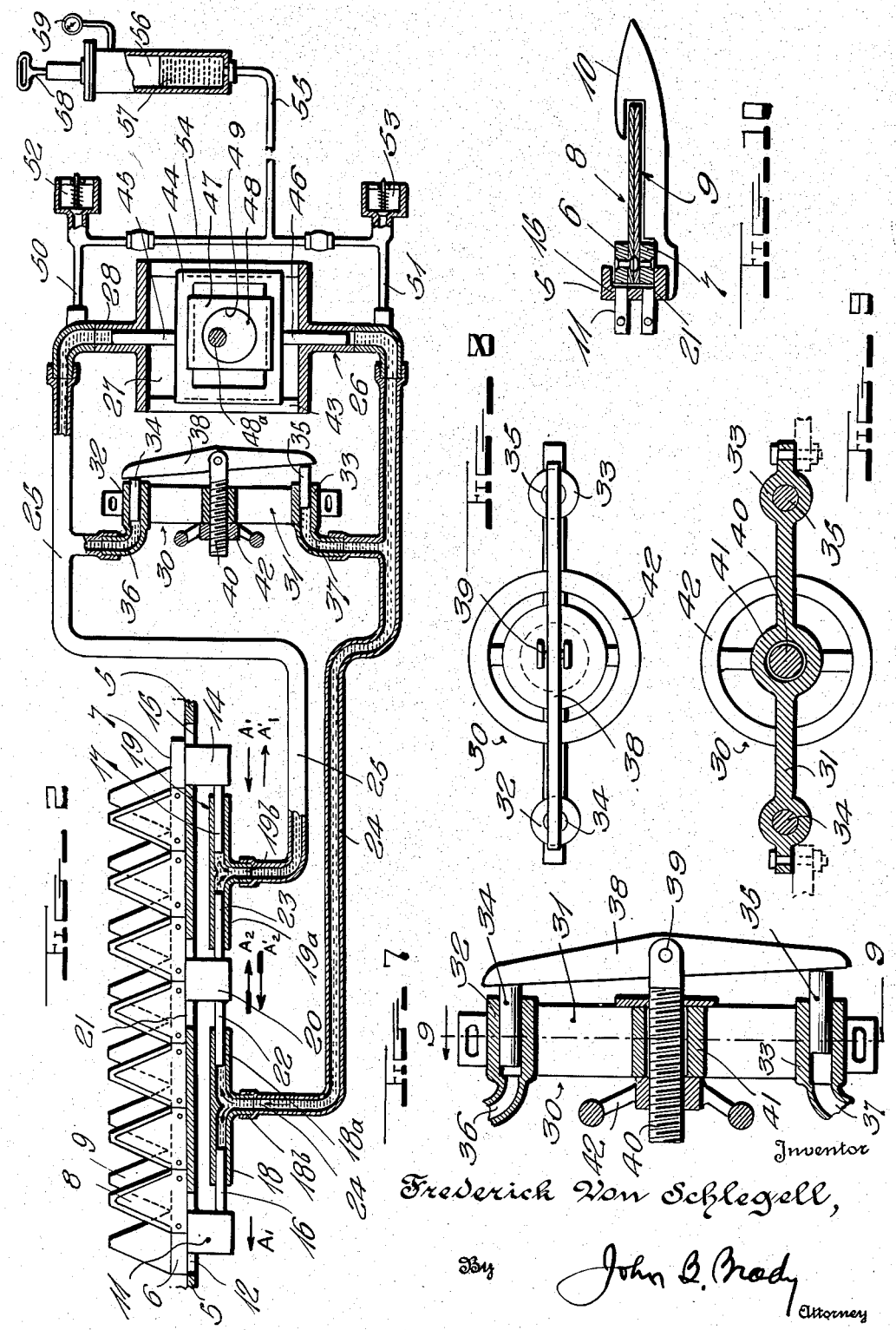

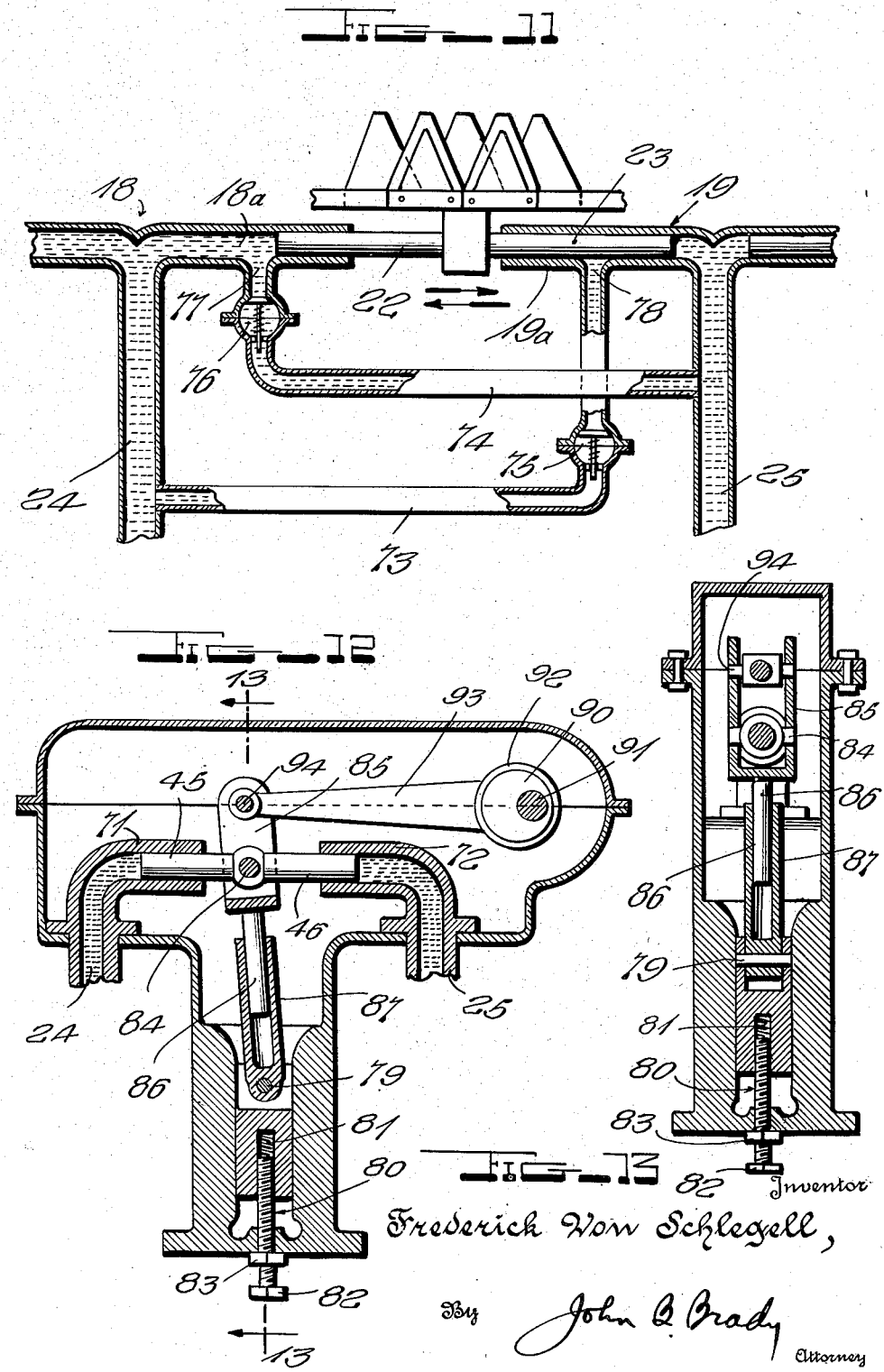

Patented Oct. 2, 1951

2,569,507

UNITED STATES PATENT OFFICE 2,569,507

HYDRAULIC OPERATING SYSTEM FOR MOWING MACHINES

Frederick von Schlegell, Pasadena, Calif.

Application October 27, 1945, Serial No. 625,038

7 Claims. (Cl. 60—54.5)

My invention relates broadly to mowing machines and more particularly to a hydraulically operated mowing machine.

One of the objects of my invention is to provide a system for actuating the sickle bar or sickle bars of a mowing machine by means of reciprocating fluid.

Another object of my invention is to provide a hydraulic operating system for mowers in which the full stroke of the sickle bar is secured regardless of such losses as might occur due to the elasticity of the tubes or other elements of the hydraulic system which might cause lost motion.

Still another object of my invention is to provide a hydraulic actuating system for mowers in which there is always a pressure present, either positive or negative so that there is no tendency for air to get into the hydraulic system at the ends of the operating stroke.

Another object of my invention is to provide a construction of single or multiple bar mower in which reciprocating action of the coacting cutters is controlled by hydraulic pressure induced through the pump system driven from the tractor engine.

A further object of my invention is to provide a simplified construction of hydraulically operating system for the sickle bar of a mowing machine in which pressure impulses in the hydraulic system are so balanced as to substantially compensate against appreciable vibration in the hydraulic system.

A further object of my invention is to provide an arrangement of oscillatory or rotary pump system for impressing reciprocatory hydraulic forces upon the sickle bar of a mowing system for inducing reciprocatory operation of the cutter bar.

Still another object of my invention is to provide control means for a hydraulically operated mowing machine in which the phase of the hydraulic power impulses applied to the cutter bar may be varied and selectively adjusted for controlling the phase of operation of the sickle bar.

Still another object of my invention is to provide a novel arrangement of by-pass pipes for the hydraulic distribution system of a hydraulically operated mower for insuring release of hydraulic pressure on the sickle bars as the sickle bars reach the limits of reciprocatory travel thereof.

Other and further objects of my invention reside in the arrangement of hydraulic control system for mowing machines as set forth more fully in the specification hereinafter following by reference to the accompanying drawings in which:

Figure 1 is a top plan view of a tractor driven hydraulically operated mowing machine embodying the principles of my invention; Fig. 2 is a diagrammatic layout plan of the hydraulically operated mowing system of my invention illustrating the phasing means which I provide for controlling the timed delivery of hydraulically operating forces to the reciprocatory sickle bars; Fig. 3 is a longitudinal sectional view through the hydraulic pump provided in the hydraulically operating system of my invention with parts of the oscillatory drive system shown in elevation; Fig. 4 is a cross-sectional view taken substantially on line 4—4 of Fig. 3; Fig. 5 is a cross-sectional view taken through a modified form of hydraulic pump which may be employed in the hydraulically operating system of my invention; Fig. 6 is a cross-sectional view taken on lines 6—6 of Fig. 5; Fig. 7 is a cross-sectional view taken through the phase control and adjusting means for the hydraulic system with parts illustrated in elevation; Fig. 8 is a plan view of the phase controller and adjuster illustrated in Fig. 7; Fig. 9 is a cross-sectional view taken substantially on line 9—9 of Fig. 7; Fig. 10 is a transverse sectional view taken substantially on line 10—10 of Fig. 1 and illustrating the independent hydraulically controlled means for each of the sickle bars of the hydraulically operated mower; Fig. 11 is a fragmentary cross-sectional view with certain of the parts shown in elevation and illustrating the manner of by-passing excess hydraulic pressure at the end of the piston strokes when the sickle bars reach the limit of travel thereof; Fig. 12 is a cross-sectional view with certain of the parts illustrated in elevation showing one method which I may provide for regulating the stroke of the hydraulic pump and selectively varying the stroke and Fig. 13 is a cross-sectional view taken substantially on line 13—13 of Fig. 12.

My invention is directed to an improved construction of mower which eliminates the complicated transmission, universal joints, gears and pitman customarily employed in the construction of mowing machines and which have heretofore been a source of considerable annoyance and have introduced many complications in manufacture. My invention is applied to mowers which have a relatively fixed bar, referred to as the cutter bar, and which supports stationary knives with associated guards and guard plates. A reciprocating bar carrying a set of knives is referred to as the sickle or sickle bar. My invention is applicable both to single and double arrangements of sickle bar mowers. Such mechanically operated sickle bars are generally mounted on a bar support which is movable to a vertical position for transportation inasmuch as such bar projects to one side of the tractor or chassis of the mowing machine. This arrangement of movable cutter bar adds to the complications in manufacture and maintenance. Such bar and the associated transmission and operating mechanism is heavy and hard to manipulate. The safety devices required also add to the complications. Moreover, such prior arrangements require that the operator continuously watch the cutting on one side of the tractor which becomes monotonous and tiresome. The prior arrangement makes a side draft on the tractor. The operator must mow in loops rather than in reciprocating path back and forth of a field.

In the improved system of my invention I provide for the mounting of the mower in front of the tractor instead of off to the side or rear. Such arrangement makes it possible to support the sickle bar in several places, thus insuring alignment between the movable cutting knives and the fixed or stationary cutting knives. In my improved arrangement it is possible to mow forward and backward of a field. The arrangement overcomes side draft on the tractor.

The reciprocating parts of the hydraulic operating system in the mowing machine of my invention are symmetrically arranged and thereby overcome vibration in the operating system by compensating for such vibration through instantaneous utilization of substantially equal and opposite hydraulic forces. The phase of the hydraulic forces which are impressed upon the reciprocating cutters of the cutting system may be readily adjusted and controlled in the system of my invention. Moreover, the stroke of the pump may be varied as required in distributing the hydraulic forces in the hydraulic operating system. Excess fluid which may be impressed by the hydraulic system upon the hydraulic mechanism for operating the cutters may be by-passed through suitable ports at the ends of the piston strokes and excessive strains thereby eliminated. Fluid pressure is always present in the closed hydraulic system although the effective pressure is either positive or negative and there is no tendency for air to leak into the system at the ends of the stroke.

Referring to the drawings in detail reference character 1 designates the chassis of the tractor mounted upon wheeled support 2 and having forwardly extending front supports 3 and 4 which serve as mounting means for the channel shaped mower bar 5. The channel shaped mower bar 5 serves as a guide means for the reciprocatory sickle bars 6 and 7 illustrated more clearly in Fig. 10. The sickle bars 6 and 7 carry cutting knives 8 and 9 suitably secured thereto and adapted to slidably reciprocate face to face with the fixed guards shown at 10. The sickle bar 6 has a rearwardly extending extension 11 thereon which passes through slot 12 in the rear wall of the channel shaped mower bar 5. At a spaced interval from the extension 11 on sickle bar 6 I provide a similar extension 14 projecting through slot 15 in the rear wall of channel shaped mower bar 5. Connected on each of these extensions there are horizontally extending piston members 16 and 17 which enter hydraulic cylinders 18 and 19.

The adjacent coacting sickle bar 7 has a rearwardly extending projection 20 thereon extending through the slot 21 in the rear wall of the channel shaped mower bar 5 in a plane offset from the plane of projections 11 and 14. The projection 20 has oppositely extending piston members 22 and 23 projecting therefrom and into the cylindrical extensions of the cylinders 18 and 19 and into the adjacent ends 18a and 19a of the cylinders 18 and 19.

The cylinders 18 and 19 are supplied with fluid pressure through pipelines 24 and 25 which are coupled to the central connections 18b and 19b of the cylinders 18 and 19. The pipeline 24 extends to the pressure cylinder 26 of the reciprocatory pump 27. The pipeline 25 extends to the pressure cylinder 28 of the reciprocatory pump 27. Intermediate the pump 27 and the connections to the hydraulic operating cylinders 18 and 19 I provide a phasing controlled adjusting mechanism shown generally at 30. The phasing controlled mechanism 30 comprises a support 31 having hydraulic cylinders 32 and 33 adjacent opposite ends thereof into each of which a piston member shown at 34 and 35 extends. The cylinder 32 is connected through pipe 36 with the pipeline 25 whereas the cylinder 33 is connected to pipeline 24 through connection 37. The fluid column in pipeline 25 may be adjusted with respect to the fluid column in pipeline 24 by adjusting the relative positions of pistons 34 and 35 through bar member 38 which is centrally connected at 39 to the screw-threaded member 40. The screw-threaded member 40 extends through the central tubular support 41 in frame 31 and is engaged by the hand wheel 42 by which the position of crossarm 38 with respect to pistons 34 and 35 may be advanced or retracted.

The pressure pump 27 is mounted within a frame structure 43 which serves as a guide for the reciprocatory frame member 44 which carries at opposite ends the piston members 45 and 46 which project into the cylinders 28 and 26 respectively. The movement of the pistons 45 and 46 is controlled by the central member 47 within which the eccentric cam 48 is driven. That is to say, member 47 has a circular aperture 49 therein within which the eccentric cam 48 is mounted for rotation under control of drive shaft 48a which as the eccentric cam 48 revolves the oppositely disposed pistons 45 and 46 are driven alternately into cylinders 28 and 26 for producing hydraulic pressure impulses in the pipelines 25 and 24 respectively.

I provide pressure by-passes for the hydraulic system through pipe connections 50 and 51 established with pipelines 25 and 24. Pressure relief valves 52 and 53 are provided in each of the pipe connections 50 and 51 respectively to avoid injury to the hydraulic conditions under conditions of stoppage or obstructions which may occur at the reciprocating knives 8 and 9. A by-pass 54 extends between the pipe connections 50 and 51 and a connection 55 extends from the by-pass 54 to a pressure reservoir 56. The fluid 57 in pressure reservoir 56 may have pressure applied thereagainst under control of the pump 58 as indicated by pressure gage 59.

I may employ a modified form of pump as represented in Figs. 5 and 6 in which the pump actuator is driven through a pair of eccentrics 60 and 61 carried by shaft 62 positively driven from a chain or belt 63 operating over drive pulley 64 carried by shaft 62. The chain or belt 63 is driven from a power driven shaft operated from the engine of the tractor. The bands 60a and 61a which embrace the eccentric cams 60 and 61 connect through links 65 and 66 with the central crosshead 67 of the pump which is operative within the slots 68 and 69 in the frame structure 70 within which reciprocate the pistons 45 and 46 in the cylinders 71 and 72 corresponding to the cylinders 20 and 26 in the forms of my invention illustrated in Figs. 3 and 4.

Fig. 11 illustrates the arrangement I provide for preventing excessive pressure upon the knives of the mower in the event that the adjustment of the hydraulic pressure may be somewhat inaccurate. Adjacent each of the cylinders 18 and 19 I provide by-pass connections represented at 73 and 74. By-pass connection 73 extends from pipeline 24 to the cylinder 19a of the pressure operating cylinder 19 through the spring pressed valve 75. The by-pass connection 74 extends between the cylinder 18a of the pressure operating cylinder 18 to the pipeline 25 through spring pressed valve 76. When the piston 22 reaches the end of its normal stroke the port 77 is uncovered and any excess fluid passes to the column of fluid in by-pass 25 and cylinder 19 through check valve 76 and by-pass 74. Conversely, when piston 23 reaches the end of its normal stroke and uncovers port 78 excess fluid is by-passed through spring pressed valve 75 and by-pass valve 73 to the pipeline 24. Thus excessive hydraulic pressure is prevented from exerting continuous forces upon the knife supports 6 and 7.

In Figs. 12 and 13 I have shown an arrangement of adjustment means for the pump of Figs. 5 and 6 wherein the displacement of pistons 45 and 46 may be adjusted with respect to the coacting cylinders 71 and 72 by raising or lowering the pivot or hinge point 79 under control of the adjustment screw 80 which extends into the screw-threaded block 81. The adjustment screw 80 may be selectively advanced or retracted by engagement of the head thereof 82 with a suitable tool and the locking of the screw into position by a lock nut 83. The pistons 45 and 46 are connected by a central member 84 which is provided with trunnions which extend into the U-shaped bracket 85. The U-shaped bracket 85 has a rod 86 extending therefrom and the latter is telescopically slideable in cylinder 87 which is pivoted at 79 to the slidable block 81. The position of the U-shaped bracket may be controlled by adjustment of the eccentric 90 with respect to shaft 91 and with respect to the circular band 92 connected to arm 93. The arm 93 is pivotally connected at 94 to the bracket 85. Thus the effective point 79 about which the bracket 85 and the rod 86 extending therefrom and the telescopic cylinder 87 may swing may be accurately adjusted to fix selectively the entry of the pistons 45 and 46 with respect to the cylinders 71 and 72 thereby controlling the stroke of the piston with respect to the fluid columns 24 and 25 for accurately adjusting the application of the hydraulic pressure forces to the reciprocatory knife supports 6 and 7.

It will be appreciated that the hydraulic mechanism of my invention is extremely compact and produces a surprising reduction in weight of the mower as a whole as compared with the mechanical operating systems heretofore available. The weight of the hydraulic mechanism with respect to the cutting knives is such that the mechanism can be readily supported on springs so that the mechanism practically floats along the top of the ground or can be easily lifted. The ease of control of applying the pressure forces to the reciprocating knife supports 6 and 7 is also an important feature of my invention as this eliminates many of the tedious hand tool adjustments which have heretofore been required in mechanical operating systems.

The fact that the cutting knives are arranged for reciprocatory movement in opposite directions simultaneously from pressure forces developed simultaneously in opposite directions substantially compensates against vibration and balances the system against shock or vibration with respect to the chassis when the mower is in operation.

Although I have illustrated my invention as applied to a double sickle bar arrangement, I wish it clearly understood that this is to be considered merely in the illustrative sense as I intend my invention to be applied to a single sickle bar type of mower in which the sickle bar is reciprocated with respect to a guard carrying guard plates that may serve as knives forming stationary cutters. The sickle bar is so actuated by the reciprocating fluid that the full stroke of the sickle bar is obtained regardless of losses due to elasticity of the tubes or other elements which might cause lost motion.

While I have described my invention in certain of its preferred embodiments I realize that modifications may be made and no limitations upon my invention are intended other than may be imposed by the scope of the appended claims.

What I claim as new and desire to secure by Letters Patent of the United States is as follows:

1. A fluid power system comprising a pair of fluid pressure delivery pipes terminating in the center connections of a pair of longitudinally spaced T fittings axially aligned with each other, said T fittings constituting fluid pressure cylinders, reciprocating driven pistons slidable in said cylinders, actuating means connected with said pistons, one of said actuating means being connected at one end with a piston slidable in one of the pressure cylinders of one T fitting and at the other end with a piston slidable in one of the pressure cylinders of the other of said T fittings and a fluid pump for applying fluid pressure impulses through said fluid pressure delivery pipes alternating to the center connections of said T fittings for reciprocating said actuating means.

2. A fluid power system as set forth in claim 1 in which the fluid pump comprises a pair of axially aligned pump cylinders with one of said pump cylinders connected with one of said fluid pressure delivery pipes and the other of said pump cylinders connected with the other of said fluid pressure delivery pipes, a reciprocatory piston individual to each of said pump cylinders and an eccentric drive for operating said last mentioned reciprocatory pistons for alternately delivering fluid pressure impulses to said fluid pressure delivery pipes.

3. A fluid power system as set forth in claim 1 in which the fluid pump comprises a pair of axially aligned pump cylinders with one of said pump cylinders connected with one of said fluid pressure delivery pipes and the other of said pump cylinders connected with the other of said fluid pressure delivery pipes, a reciprocatory piston individual to each of said pump cylinders, an eccentric drive for operating said last mentioned reciprocatory pistons for alternately delivering fluid pressure impulses to said fluid pressure delivery pipes, and means connected with both of said fluid delivery pipes and adjustable through a common means for differentially regulating the effective pressure of said fluid pump in said fluid pressure delivery pipes.

4. A fluid power system as set forth in claim 1 in which the fluid pump comprises a pair of axially aligned pump cylinders with one of said cylinders connected with one of said pump cylinders connected with one of said fluid pressure delivery pipes and the other of said pump cylinders connected with the other of said fluid pressure delivery pipes, a reciprocatory piston individual to each of said pump cylinders, an eccentric drive for operating said last mentioned reciprocatory pistons for alternately delivering fluid pressure impulses to said fluid pressure delivery pipes, means connected with both of said fluid delivery pipes and adjustable through a common means for differentially regulating the effective pressure of said fluid pump in said fluid pressure delivery pipes, said last mentioned means being located intermediate said fluid pump and said T fittings.

5. A fluid power system comprising a pair of fluid pressure delivery pipes terminating in the center connections of a pair of longitudinally spaced T fittings axially aligned with each other, said T fittings constituting fluid pressure cylinders, reciprocating driven pistons slidable in said cylinders, actuating means connected with said pistons, one of said actuating means being connected at one end with a piston slidable in one of the pressure cylinders of one T fitting and at the other end with a piston slidable in one of the pressure cylinders of the other of said T fittings, a fluid pump for applying fluid pressure impulses through said fluid pressure delivery pipes alternating to the center connections of said T fittings for reciprocating said actuating means, and means for by-passing fluid pressure impulses from one of said T fittings to the other T fitting when the reciprocating driven pistons slidable therein approach the respective limits of travel thereof.

6. A fluid power system comprising a pair of fluid pressure delivery pipes terminating in the center connections of a pair of longitudinally spaced T fittings axially aligned with each other, said T fittings constituting fluid pressure cylinders, reciprocating driven pistons slidable in said cylinders, actuating means connected with said pistons, one of said actuating means being connected at one end with a piston slidable in one of the pressure cylinders of one T fitting and at the other end with a piston slidable in one of the pressure cylinders of the other of said T fittings, a fluid pump for applying fluid pressure impulses through said fluid pressure delivery pipes alternating to the center connections of said T fittings for reciprocating said actuating means, a by-pass pipe connected between the fluid pressure cylinder of one of said T fittings with the pressure delivery pipe that connects with the other of said T fittings, a spring loaded pressure controlled relief valve in said by-pass pipe, another by-pass pipe connected between the adjacent fluid pressure cylinder of the other of said T fittings and the other of said fluid delivery pipes, a spring loaded pressure controlled relief valve in said last mentioned by-pass pipe, said valves operating alternately as the reciprocating driven pistons slidable in said T fittings approach the respective limits of travel thereof.

7. A fluid power system as set forth in claim 1 in which the fluid pump comprises a pair of axially aligned pump cylinders with one of said pump cylinders connected with one of said fluid pressure delivery pipes and the other of said pump cylinders connected with the other of said fluid pressure delivery pipes, a reciprocatory piston individual to each of said pump cylinders, an eccentric drive for operating said last mentioned reciprocatory pistons for alternately delivering fluid pressure impulses to said fluid pressure delivery pipes, a pressure adjusting cylinder individual to each of said fluid pressure delivery pipes and terminating in axial alignment with each other, a pair of axially aligned pistons, one of said last mentioned pistons slidably extending into one of said pressure adjusting cylinders and the other of said last mentioned pistons slidably extending into the other of said pressure adjusting cylinders, an arm pivotally connected centrally of said axially aligned pistons and an adjustable eccentric connected with said arm and angularly shiftable for shifting the position of said last mentioned pistons in said aligned pressure adjusting cylinders for predetermining the time phase of operation of said first mentioned reciprocating driven pistons slidable in said first mentioned fluid pressure cylinders.

FREDERICK von SCHLEGELL.

REFERENCES CITED

The following references are of record in the file of this patent:

UNITED STATES PATENTS

| Number | Name | Date |
|---|---|---|
| 1,814,649 | Wade | July 14, 1931 |
| 1,939,851 | Horste | Dec. 19, 1933 |
| 1,958,405 | Anthony et al. | May 15, 1934 |
| 2,171,761 | Paradise et al. | Sept. 5, 1939 |
| 2,414,519 | Greene, Jr. | Jan. 21, 1947 |
| 2,420,406 | Andrews et al. | May 13, 1947 |